United States Patent
Teyeb et al.

(10) Patent No.: US 11,212,700 B2
(45) Date of Patent: Dec. 28, 2021

(54) METHOD AND APPARATUS FOR DETECTING DELAYED OR LOST CONTROL SIGNALING MESSAGES

(71) Applicant: Telefonaktiebolaget LM Ericsson (publ), Stockholm (SE)

(72) Inventors: Oumer Teyeb, Solna (SE); Gunnar Mildh, Sollentuna (SE); Riikka Susitaival, Helsinki (FI); Stefan Wager, Espoo (FI); Osman Nuri Can Yilmaz, Espoo (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 238 days.

(21) Appl. No.: 16/610,123

(22) PCT Filed: Apr. 20, 2018

(86) PCT No.: PCT/SE2018/050400
§ 371 (c)(1),
(2) Date: Nov. 1, 2019

(87) PCT Pub. No.: WO2018/203794
PCT Pub. Date: Nov. 8, 2018

(65) Prior Publication Data
US 2020/0092748 A1    Mar. 19, 2020

Related U.S. Application Data

(60) Provisional application No. 62/501,370, filed on May 4, 2017.

(51) Int. Cl.
*H04W 28/04* (2009.01)
*H04W 76/19* (2018.01)
(Continued)

(52) U.S. Cl.
CPC .......... *H04W 28/04* (2013.01); *H04L 1/1642* (2013.01); *H04L 1/1848* (2013.01);
(Continued)

(58) Field of Classification Search
CPC ..... H04W 28/04; H04W 76/19; H04W 76/15; H04W 80/02; H04W 36/0079;
(Continued)

(56) References Cited

U.S. PATENT DOCUMENTS

2008/0089292 A1    4/2008  Kitazoe et al.
2010/0254320 A1   10/2010  Aoyama
(Continued)

FOREIGN PATENT DOCUMENTS

CN    101982005 A    2/2011
CN    105960772 A    9/2016
(Continued)

OTHER PUBLICATIONS

Unknown, Author, "Higher Layer Protocol Functions and Services", 3GPP TSG-RAN WG2 #94, Tdoc R2-164025, Ericsson, Nanjing, P.R. China, May 23-27, 2016, 6 pages.
(Continued)

*Primary Examiner* — Kyaw Z Soe
(74) *Attorney, Agent, or Firm* — Murphy, Bilak & Homiller, PLLC

(57) ABSTRACT

The present disclosure relates in general to cellular radio network communication. In one of its aspects, the technology presented herein concerns a method implemented in a receiver for detecting delayed or lost signaling messages. The signaling messages are receivable both over a Master Node, MN, and a Secondary Node, SN, and detecting delayed or lost signaling messages is based on sequence number. The method comprises detecting a gap in sequence numbers of received signaling messages.

28 Claims, 8 Drawing Sheets

(51) Int. Cl.
    *H04W 76/15*     (2018.01)
    *H04L 1/16*     (2006.01)
    *H04L 1/18*     (2006.01)
    *H04W 80/02*     (2009.01)

(52) U.S. Cl.
    CPC .......... *H04L 1/1864* (2013.01); *H04W 76/15* (2018.02); *H04W 76/19* (2018.02); *H04W 80/02* (2013.01)

(58) Field of Classification Search
    CPC   H04W 36/0069; H04W 92/02; H04L 1/1642; H04L 1/1848; H04L 1/1864; H04L 1/00
    See application file for complete search history.

(56) References Cited

U.S. PATENT DOCUMENTS

| | | |
|---|---|---|
| 2013/0051214 A1 | 2/2013 | Fong et al. |
| 2015/0365856 A1 | 12/2015 | Krishnamoorthy et al. |
| 2016/0183151 A1 | 6/2016 | Wu |
| 2016/0205626 A1 | 7/2016 | Chen |
| 2016/0302075 A1 | 10/2016 | Dudda et al. |
| 2016/0315868 A1 | 10/2016 | Zhang et al. |
| 2017/0208486 A1* | 7/2017 | Peterson ............. A61L 27/3633 |
| 2017/0353896 A1* | 12/2017 | Nath ...................... H04W 76/19 |
| 2021/0160964 A1* | 5/2021 | Sun ..................... H04W 52/242 |

FOREIGN PATENT DOCUMENTS

| | | |
|---|---|---|
| CN | 105992380 A | 10/2016 |
| EP | 1337125 A2 | 8/2003 |
| JP | 2016058796 A | 4/2016 |

OTHER PUBLICATIONS

Unknown, Author, "NR SCG SRB Handling in UE", 3GPP TSG-RAN WG2 Meeting #97bis, R2-1703430, Intel Corporation, Spokane, USA, Apr. 3-7, 2017, 4 pages.

Unknown, Author, "SCG Re-establishment in EN-DC", 3GPP TSG-RAN WG2 Meeting #97bis, R2-1703683, LG Electronics Inc., Spokane, USA, Apr. 3-7, 2017, 3 pages.

Unknown, Author, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.0.0, Sep. 2016, 314 pages.

Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 664 pages.

Unknown, Author, "3rd Generation Partnership Project; Technical Specification Group Radio Access Network; New Generation Radio Access Network; User Equipment (UE) procedures in Idle mode (Release 15)", 3GPP TS 38.304 v0.0.1, Mar. 2017, 13 pages.

Unknown, Author, "3rd Generation Partnership Project; Technical Specification Group Radio Access Network; Study on new radio access technology: Radio access architecture and interfaces (Release 14)", 3GPP TR 38.801 V14.0.0, Mar. 2017, 91 pages.

Unknown, Author, "Discussion on Multi-Connectivity data duplication for URLLC", 3GPP TSG RAN WG2 AH_NR Meeting, R2-1700373, Spokane, USA, Jan. 17-19, 2017, pp. 1-2.

Unknown, Author, et al., "PDCP Reordering Operation for the Alternative 3C", 3GPP TSG-RAN WG2 Meeting #85, R2-140053, Prague, Czech Republic, Feb. 10-14, 2014, pp. 1-4.

"RRC message transmission for LTE NR tight interworking", 3GPP TSG-RAN WG2 Meeting AH, R2-1700300, Huawei, HiSilicon, Spokane, US, Jan. 17-19, 2017, 2 pages.

* cited by examiner

METHOD AND APPARATUS FOR DETECTING DELAYED OR LOST CONTROL SIGNALING MESSAGES

TECHNICAL FIELD

The present disclosure relates in general to cellular radio network communication and in particular to the development within 3GPP 5G New Radio (NR), but may also be applicable to other radio communication systems. For example, the present disclosure presents technologies related to signaling message diversity and split Signaling Radio Bearers (SRB).

BACKGROUND

This section is intended to provide a background to the various embodiments of the invention that are described in this disclosure. Therefore, unless otherwise indicated herein, what is described in this section should not be interpreted to be prior art by its mere inclusion in this section.

LTE-NR Tight Interworking

In LTE, the Radio Resource Control (RRC) protocol is used to configure/setup and maintain the radio connection between the UE and the eNB. When the UE receives an RRC message from the eNB, it will apply, or compile, the configuration, and if this succeeds, the UE generates an RRC complete message that indicates the transaction ID of the message that triggered this response.

E-UTRAN supports Dual Connectivity (DC) operation whereby a multiple Rx/Tx UE in RRC_CONNECTED is configured to utilize radio resources provided by two distinct schedulers, located in two different eNBs, or radio base stations, connected via a non-ideal backhaul over the X2 interface (see 3GPP 36.300). "Non-ideal backhaul" implies that the transport of messages over the X2 interface between the nodes may be subject to both packet delays and losses.

eNBs involved in DC for a certain UE may assume two different roles: an eNB may either act as an MN (Master node), also referred to as Master eNB (MeNB) or as an SN (Secondary node), also referred to as Secondary eNB (SeNB). In DC, a UE is connected to one MN and one SN.

In LTE DC, the radio protocol architecture that a particular bearer uses depends on how the bearer is setup. Three bearer types exist: MCG (Master Cell Group) bearer, SCG (Secondary Cell Group) bearer and split bearers. RRC is located in MN and SRBs (Signaling Radio Bearers) are always configured as MCG bearer type and therefore only use the radio resources of the MN. When a node acts as an SN, the LTE DC solution does not have any UE RRC context of that UE and all such signaling is handled by the MN.

Thus, in the known LTE DC solution, signaling messages, such as RRC messages, are not subject to delays and losses of the kind that may occur over the non-ideal X2 interface, since the signaling messages are not relayed via the SN node. FIG. 1 illustrates LTE DC User Plane (UP).

In 3GPP, a study item on a new radio interface for 5G has recently been completed and 3GPP has now continued with the effort to standardize this new radio interface, often abbreviated by NR (New Radio). Within the context of this disclosure, the terms 5G and NR will be used interchangeably, and it will be apparent from the context if the term refers specifically to the NR radio interface, or if the terms refer to the broader 5G architectural concepts.

The solutions described in this disclosure is not only limited to solution that operate with the NR or LTE technologies. The embodiments disclosed herein is generally applicable to any technology that require a solution for detecting, managing and recovering from problems occurring when signaling messages may be duplicated, lost or severely delayed, particularly in a dual-connectivity situation, wherein signaling messages can be transferred through multiple links served by multiple infrastructure nodes.

LTE-NR (New Radio) DC, also referred to as LTE-NR tight interworking is currently being discussed for rel-15. The SN in this case is also referred to as SgNB, secondary gNB, where gNB denotes the NR base station.

In this context, the major changes from LTE DC are
The introduction of split bearer from the SN (known as SCG split bearer).
The introduction of split bearer for RRC
The introduction of direct RRC from the SN FIGS. 2 to 4 show the User Plane (UP) and Control Plane (CP) architectures for LTE-NR tight interworking.

It should be appreciated that the present invention applies to different scenarios where the MN and SN nodes can apply various radio interface technologies. The MN node can apply e.g. LTE or NR, and the SN node can also use either LTE or NR without departing from the main concept of this invention. Other technologies could also be used over the radio interface. The 3GPP technical report TR 38.304 includes various scenarios and combinations where the MN and SN are applying either NR, LTE or both.

For the first phase of 5G standardization and 5G deployment, the most likely scenario is that MN will apply LTE, and the SN will apply the new radio interface, NR, currently being under standardization.

As already mentioned above, the DC approach introduced for 5G standardization includes a solution for split bearers for SRBs, see FIGS. 3 and 4. The intent of introducing such "RRC diversity" is to enable e.g. better mobility robustness and improved message delivery between the infrastructure and the UE 403. For example, it is then possible to send a handover message or any other reconfiguration message over the best link, even if one of either the link or links to the MN 401 (or SN 402) has deteriorated significantly. It is also possible to send duplicates of the same message over both MN 401 and SN 402 to achieve a better success-rate and faster delivery of the concerned message, in case the links are error prone. Such benefits of "RRC diversity" is not available in the current LTE DC solution, and 3GPP has therefore undertaken the challenge to enable such RRC diversity. Having RRC diversity may prove particularly important for ultra-reliable connections with low latency, often called URLLC.

Current agreements in 3GPP include that "split SRBs" solutions shall be available for both SRB1 480 and SRB2 490. For example, SRB1 480 is likely to be used for transmission of reconfiguration messages, handover messages, and for transferring of core-network signaling messages between the UE and the infrastructure. SRB2 490 may be used for example for measurement reports, and potentially for some non-critical messages with a different priority compared to the messages on SRB1 480. It should be noted that the current invention applies to both uplink and downlink split SRBs. FIG. 4 includes a schematic illustration of three SRBs 460, 470, 480, 490. The leftmost 470 is only transmitted over MN 401, and the rightmost 460 is only transmitted over SN 402. The middle ones, SRB1 480 and SRB2 490, are wherein messages can be transmitted both over MN 401 and SN 402.

FIG. 4 illustrates a scenario where MN 401 is operating with LTE, and SN 402 is operating with NR. As can be seen, RRC messages generated/transmitted from the MN 401 can be sent either via the MN 401, or relayed over an X2 interface to the SN node 402 that here uses the NR technology. The messages received over the different paths in the UE 403 are then combined to the LTE RRC receiving entity and processed further. In the uplink, the UE 403 generates LTE RRC messages that it may transmit either over the NR radio interface towards the SN node 402 or via the MN node 401 using LTE technology. Messages received in the SN node 402 are then forwarded over an X2 interface towards the MN node 401.

Functional Split Between Central and Distributed Unit

During the study item phase of NR, as summarized in 3GPP TR 38.801, different functional splits between central and distributed units were considered. The following functional splits between central and distributed unit were considered, as illustrated in FIG. 5.

The different options are:

Option 1 (1A-like split)
The function split in this option is similar as 1A architecture in DC. RRC is in the central unit. Packet Data Convergence Protocol (PDCP), Radio Link Control (RLC), Medium Access Control (MAC), physical layer and Radio Frequency (RF) are in the distributed unit.

Option 2 (3C-like split)
The function split in this option is similar as 3C architecture in DC. RRC, PDCP are in the central unit. RLC, MAC, physical layer and RF are in the distributed unit.

Option 3 (intra RLC split)
Low RLC (partial function of RLC), MAC, physical layer and RF are in distributed unit. PDCP and high RLC (the other partial function of RLC) are in the central unit.

Option 4 (RLC-MAC split)
MAC, physical layer and RF are in distributed unit. PDCP and RLC are in the central unit.

Option 5 (intra MAC split)
RF, physical layer and some part the MAC layer (e.g. HARQ) are in the distributed unit. Upper layer is in the central unit.

Option 6 (MAC-PHY split)
Physical layer and RF are in the distributed unit. Upper layers are in the central unit.

Option 7 (intra PHY split)
Part of physical layer function and RF are in the distributed unit. Upper layers are in the central unit.

Option 8 (PHY-RF split)
RF functionality is in the distributed unit and upper layer are in the central unit.

In the RAN3 95bis meeting in April, it was agreed that centralization of PDCP and decentralization of RLC-MAC-PHY (i.e. option 2 above) will be the RAN split option to be supported in Rel-15. A new interface named F1 has also been defined between the Central Unit (CU) hosting protocols above RLC (PDCP/RRC . . . ) and the Decentralized Unit (DU) hosting RLC/MAC/PHY.

SUMMARY

It is in view of the above background and other considerations that the various embodiments of the present disclosure have been made.

The intent to enable "split RRC", also denoted e.g. "RRC diversity", "split SRB", could introduce some severe problems. The inventors realize that in the scenarios outlined above, the X2 interface between the MN and the SN may cause severe delays, re-ordering of subsequent RRC, i.e. signaling messages, and even loss of such RRC messages. Such delays and losses of messages could severely affect a reliable and uninterrupted operation of a UE. Split RRC may also result in race-conditions, wherein messages are not received in the same order as they were transmitted, as the transmission in one of MN or SN may take longer time than the other path. Thus, later messages may over-take a previous one before received at the receiver.

The X2 interface may be implemented such that there is no guarantee of message delivery between the MN and SN nodes. As a consequence, it may happen that a message is lost when it is transmitted between the MN and the SN. This is different from the DC solution known from LTE, where lossless and in-sequence delivery of RRC messages can still be ensured between the MN and the UE as there was no split RRC and as such RRC data never traverses the X2 interface.

For example, it could happen that a handover command or security re-configuration message in the downlink is lost over the X2 interface. Applying the known solutions for LTE, it could then happen that the base-station (MN) assumes that the message has been received and complied with in the UE, while the UE never received the message. Thus, it could happen that the infrastructure, e.g. MN, SN, and the UE apply configurations that do not match, i.e. that for instance the MN uses one security configuration and the UE applies another configuration. I.e. there is a mismatch between the configurations of the peer entities. In a worst-case scenario, the communicating peer entities will no longer be able to communicate, for example because they are applying different security keys or other parameters that must be the same in both entities to facilitate communication.

Even if the RRC waits for the complete response from the UE before applying the changes, e.g. send security mode command, and do not apply the new security keys until a complete response is sent, problems may occur. E.g. if message 1 was sent with keys_old, then message 2 configures new keys, keys_new, and message 3 uses the new keys. Even if we ensure that keys-new is not used before sending message 3, there may be an issue. If there is an out of order delivery, there will still be an issue, because it could be that message 1 was lost or delayed a lot, message 2 is sent an acknowledged with a complete message, then message 3 was sent and received properly using the new key, now if message 1 arrives, then the UE will try to use the new key, which will cause integrity verification error.

Thus, there is a need for a solution for solving the aforementioned problem. In particular, there is a need for detecting signaling message losses and severe signaling message delays in a receiver of signaling messages, wherein the signaling messages can be received both over a communication link or links managed by an MN and an SN, respectively, i.e. in the scenario of "split SRB" as outlined above.

It is worth mentioning that the problem description above focuses on the issue of lost or severely delayed RRC messages over the X2 interface between MN and SN. However, the same or similar problem or problems may occur also in a solution where the radio protocols of the cellular system are split into a centralized architecture with remote units, as described above. The recent RAN3 agreement to support centralization of PDCP, i.e. PDCP and RLC terminated in different physical nodes, also leads to a similar problem as in the case of split RRC. That is, a PDCP packet carrying an RRC message may be lost or reordered on the F1 interface between the CU and DU, before it reaches the RLC layer at the node hosting the decentralized lower layer protocols, the same applies for an RLC message going to the centralized PDCP in the UL.

In this case, not all RRC DL messages will be delivered to the UE over the radio interface. It could also happen that the messages are delivered out of order over the radio interface. Similar problem can occur for UL RRC messages which are successfully delivered over the radio interface using RLC AM mode but are lost or re-ordered over F1 or X2 interfaces.

It is also worth mentioning that, while the split bearer solution has been known from LTE DC for the user-plane part, the aforementioned problems do not occur for user-plane. This is because loss of user plane PDCP packets over the X2 will at the end results in out of order delivery of the packets to the transport/application layers. For some services, e.g. video streaming, this may not cause a big problem, e.g. loss of a packet or two might not be even noticeable for a high definition video streaming. Even if reliability was required for the service, application/transport level recovery/retransmission, e.g. through TCP, will kick in when out of order data is received. There is no such higher layer operating above RRC that can provide such reliability. Also, the problem of out of order delivery, e.g. a security mismatch, described above is not relevant for the user plane data, as user plane is used to carry transfer data traffic only.

Another issue is that it has been agreed in 3GPP that the RLC protocol layer operating in acknowledge mode in NR should not be required (as in LTE) to deliver packets in order to higher layer. Instead, this functionality is taken over by the PDCP protocol. A consequence of this is that even if X2 or F1 interfaces are not used and that the RRC/PDCP/RLC protocol layers are implemented in the same node on the network side, it could still occur situations where the PDCP layer receives packets out of order e.g. due to RLC re-transmission of some earlier packets. In case the radio conditions are getting worse it could happen that the PDCP layer never gets the missing PDCP packet. For user plane this is not a problem since it is possible to for PDCP layer to consider the missing packet lost and only deliver the later packets to higher layers and rely on higher layer re-transmissions e.g. TCP. For signaling, this is not possible though since RRC does not have any re-transmission functionality by itself.

In view of the above, it is therefore a general object of the aspects and embodiments described throughout this disclosure to provide a solution for detecting delayed or lost control signalling messages.

This general object has been addressed by the appended independent claims. Advantageous embodiments are defined in the appended dependent claims.

According to a first aspect, there is provided a method implemented in a receiver for detecting delayed or lost control signaling messages, wherein the signaling messages are receivable both over a Master Node, MN, and a Secondary Node, SN, and wherein detecting delayed or lost signaling messages is based on sequence number. The method comprises detecting a gap in sequence numbers of received signaling messages.

In one embodiment, the signaling messages are Radio Resource Control, RRC, messages.

In one embodiment, the gap in sequence numbers of received RRC messages may be detected by a gap in sequence numbers of transaction identifiers, wherein the transaction identifiers are sequence numbers implemented on the RRC messages.

In another embodiment, the gap in sequence numbers of received messages may be detected by a gap in Packet Data Convergence Protocol, PDCP, sequence numbers of the received messages.

In one embodiment, a recovery procedure is initiated in response to detecting a gap in the sequence numbers of the received messages. The recovery procedure is initiated to ensure that the effects of a message delay or a message loss may be minimized.

In one exemplary embodiment, a timer is started when a gap in sequence numbers of received messages is detected. The timer is started in order to cover for a possible delay of the RRC message causing the gap, but wherein the missing message potentially is still in transfer and wherein the recovery procedure is postponed until the expiry of the timer.

In one embodiment, the recovery procedure may include sending a notification of a missing message to the transmitter.

In one embodiment, the recovery procedure comprises initiating an RRC re-establishment. The RRC re-establishment comprises performing a cell selection procedure, and attempting to recover the RRC connection with an RRC message. The recovery procedure may further comprise resetting configurable parameters and state parameters of lower-layer protocols, such as PCDP, Radio Link Control (RLC), Medium Access Control (MAC) and Phy.

In one embodiment, the RRC message further includes a message type identifier, which identifies whether said message must be processed in-sequence with previously transmitted messages and it is determined whether there is a need to initiate a recovery procedure or if a current RRC command can be executed without waiting for a former message.

According to a second aspect, there is provided a receiver implementing the method according to the first aspect.

In one exemplary embodiment, the receiver for detecting delayed or lost control signaling messages comprises RF transceiver circuitry, device readable medium and processing circuitry. The signaling messages are receivable both over a Master Node, MN, and a Secondary Node, SN, and wherein detecting delayed or lost signaling messages is based on sequence number. The processing circuitry is configured to control the device readable medium and transceiver circuitry to detect a gap in sequence numbers of received messages.

In one embodiment, the signaling messages are Radio Resource Control, RRC, messages.

In one embodiment, the processing circuitry is further configured to control the device readable medium and the transceiver circuitry to detect the gap in sequence numbers of received messages by a gap in sequence numbers of transaction identifiers, wherein the transaction identifiers are sequence numbers implemented on the RRC messages.

In another embodiment, the processing circuitry is further configured to control the device readable medium and the transceiver circuitry to detect the gap in sequence numbers of received messages by a gap in Packet Data Convergence Protocol, PDCP, sequence numbers of received.

In one embodiment, the processing circuitry is further configured to control the device readable medium and the transceiver circuitry to initiate a recovery procedure, in response to that a gap in the sequence numbers of the received messages is detected, to ensure that the effects of a message delay or a message loss may be minimized.

In one embodiment, the processing circuitry is further configured to control the device readable medium and the transceiver circuitry to start a timer when a gap in sequence numbers of received messages is detected, in order to cover for a possible delay of the RRC message causing the gap, but wherein the missing signaling message potentially is still in transfer, and wherein the recovery procedure is postponed until the expiry of the timer.

In one embodiment, the processing circuitry is further configured to control the device readable medium and the transceiver circuitry to initiate the recovery procedure by sending a notification of a missing message to the transmitter.

In one embodiment, the processing circuitry is further configured to control the device readable medium and the transceiver circuitry to perform the recovery procedure by initiating an RRC re-establishment, wherein the processing circuitry is further configured to control the device readable medium and the transceiver circuitry to perform a cell selection procedure, and attempt to recover the RRC connection with an RRC message. The processing circuitry may further be configured to re-set configurable parameters and state parameters of lower-layer protocols, such as PDCP, Radio Link Control (RLC), Medium Access Control (MAC) and Phy.

In one embodiment, the RRC message further includes a message type identifier, which identifies whether said message must be processed in-sequence with previously transmitted messages, and wherein the processing circuitry is further configured to control the device readable medium and the transceiver circuitry to determine whether there is a need to initiate a recovery procedure, or if a current RRC command can be executed without waiting for a former message.

In one embodiment, the receiver is a User Equipment, UE, or a receiver in the infrastructure, such as a Master Node, MN.

According to a third aspect, there is provided a method implemented in a transmitter for transmitting control signaling messages. The signaling messages are transmittable both over a Master Node, MN, and a Secondary Node, SN. The method comprises assigning sequence numbers to the signaling messages and transmitting the signaling messages to a receiver.

In one embodiment, the signaling messages are Radio Resource Control, RRC, messages.

In one embodiment, a message type identifier is included in each transmitted RRC message, wherein the RRC message type identifier identifies whether the concerned message must be processed in-sequence with previously transmitted messages.

In one embodiment, the transmitted signaling messages are stored until they are successfully acknowledged from the receiver in order to enable a re-transmission of missing messages.

In one embodiment, the stored signaling message is deleted after an acknowledge response has been received from the receiver.

In one embodiment, a notification of a missing signaling message from the receiver is received, and the signaling messages are retransmitted reusing the same sequence numbers that was used when the message(s) was sent the first time.

In one embodiment, a timer is started when the RRC message is transmitted to the receiver and the timer is reset when a response message is received from the receiver, or if the timer times out before, the signaling message is retransmitted using the same sequence numbers that was used when the message(s) was sent the first time.

According to a fourth aspect, there is provided a transmitter for transmitting control signaling messages. The signaling messages are transmittable both over a Master Node, MN, and a Secondary Node, SN. The transmitter comprises RF transceiver circuitry, device readable medium and processing circuitry, wherein the processing circuitry is configured to control the device readable medium and transceiver circuitry to assign sequence numbers to the signaling messages and transmit the signaling messages to a receiver.

In one embodiment, the signaling messages are Radio Resource Control, RRC, messages.

In one embodiment, the processing circuitry is further configured to control the device readable medium and the transceiver circuitry to include a message type identifier in each transmitted RRC message, wherein the RRC message type identifier identifies whether the concerned message must be processed in-sequence with previously transmitted messages.

In one embodiment, the processing circuitry is further configured to control the device readable medium and the transceiver circuitry to store transmitted signaling messages until they are successfully acknowledged from the receiver in order to enable a re-transmission of missing messages.

In one embodiment, the processing circuitry is further configured to control the device readable medium and the transceiver circuitry to delete the stored signaling message after an acknowledge response has been received from the receiver.

In one embodiment, the processing circuitry is further configured to control the device readable medium and the transceiver circuitry to receive a notification of a missing signaling message from the receiver, and retransmit the signaling messages reusing the same sequence numbers that was used when the message(s) was sent the first time.

In one embodiment, the processing circuitry is further configured to control the device readable medium and the transceiver circuitry to start a timer when the RRC message is transmitted to the receiver, and reset the timer when a response message is received from the receiver, and if the timer times out before, retransmit the signalling message reusing the same sequence numbers that was used when the message(s) was sent the first time.

In one embodiment, the transmitting entity is a User Equipment, UE, or a Master Node, MN.

According to a fifth aspect, there is provided a computer program comprising instructions which, when executed on a processing circuitry, cause the processing circuitry to carry out the method according to any of the first and third aspect.

According to a sixth aspect, there is provided a carrier containing the computer program of the fifth aspect, wherein the carrier is one of an electronic signal, optical signal, radio signal, or computer readable storage medium.

In the present disclosure, a UE implements a solution for detecting delayed or lost signaling messages. The messages may be RRC messages.

In response to the detection, the UE responds by a recovery mechanism. The recovery mechanism includes one or multiple steps to ensure that the effects of the message delay or message loss can be minimized. In various embodiments, different recovery mechanisms can be implemented, wherein each of the recovery mechanisms can be implemented alone, or in combination. The various recovery mechanisms are further described below.

In a preferred embodiment, the UE uses split SRB, RRC diversity, in which the UE may receive and transmit messages both over an MN and an SN.

In particular, the UE may implement the radio protocol of NR, as currently being specified in 3GPP, in addition to the implementation of LTE as defined by 3GPP. LTE undergoes a continuous evolution to meet the demands of future communication.

The invention also includes a receiver in the infrastructure, which is capable of detecting delayed or lost signaling messages. In a particular embodiment, the infrastructure includes an MN node implemented to detect such delayed or lost messages, for example RRC messages. In response to the detecting, the MN node may issue recovery mechanisms to minimize the effects of the lost or delayed message, as will be described in the detailed description of the present invention.

In one embodiment, the UE detects a delay or loss of a message over an SRB by detecting a gap in the PDCP sequence numbers of received messages. I.e. the UE may for example have received messages numbered . . . , 3, 4, 5. Then it receives message 7. By this sequence, the UE realizes that message 6 may be delayed or lost.

The detector in the UE may also apply a timer, before it determines that the aforementioned message was lost.

The present invention enables "split SRB" and the benefits of signaling diversity over multiple links by eliminating the severe problems that may occur in response to substantially delayed or missing signaling messages, such as RRC messages.

For example, a missing RRC message could result in that communication from and to the UE is impossible, if for example security parameters are in mismatch between an infrastructure node and the UE. The present invention will enable a very fast and smooth recovery mechanism from such occurrences.

Alternatively, if current RLC and/or PDCP protocols known from LTE would be applied as such, it could happen that the ARQ mechanisms of RLC and PDCP would stall, as those protocols are mainly crafted to receive all packets/messages without gaps for in-sequence delivery to upper layers. Thus, if messages then never arrive due to losses over e.g. an X2-type of interface, the protocol might stall unless detection and recovery mechanisms as described in this invention are applied.

The invention is particularly useful when NR is applied in spectra wherein high bit-rates can be achieved, but wherein link conditions can vary drastically because of e.g. beamforming and fast fading. In such situations, the probability of message losses is increased, and the need for both RRC diversity and recovery solutions is excelled.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

BRIEF DESCRIPTION OF THE DRAWINGS

Various aspects of the present invention will now be described, by way of example, based on embodiments with reference to the accompanying drawings, wherein.

DETAILED DESCRIPTION

Figure 1:
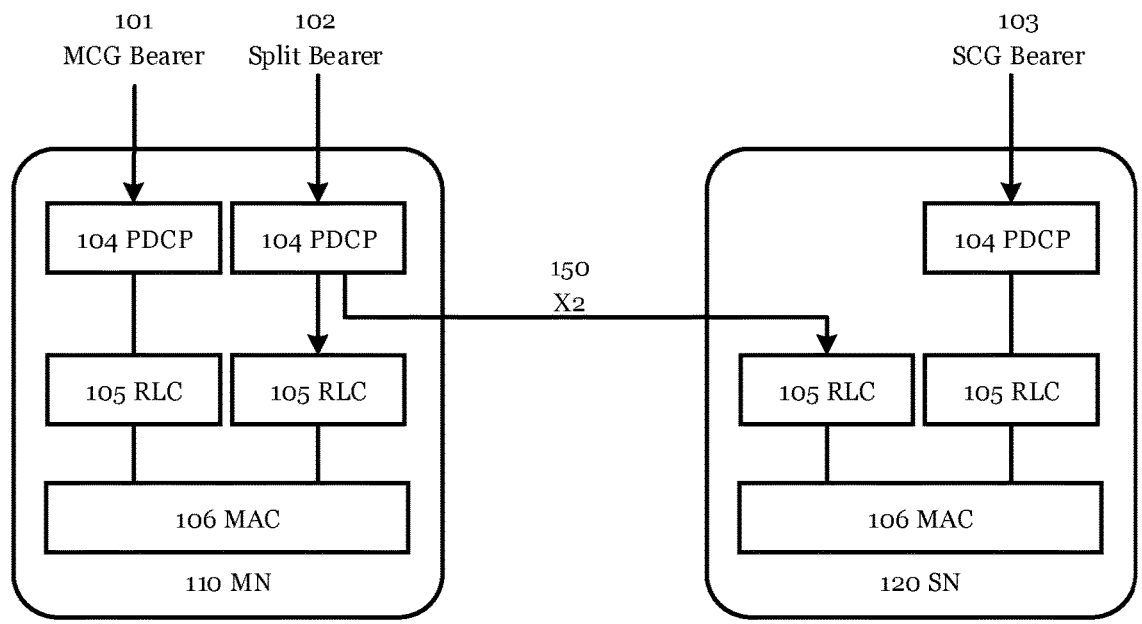
FIG. 1 illustrates a LTE DC User Plane.
Figure 2:
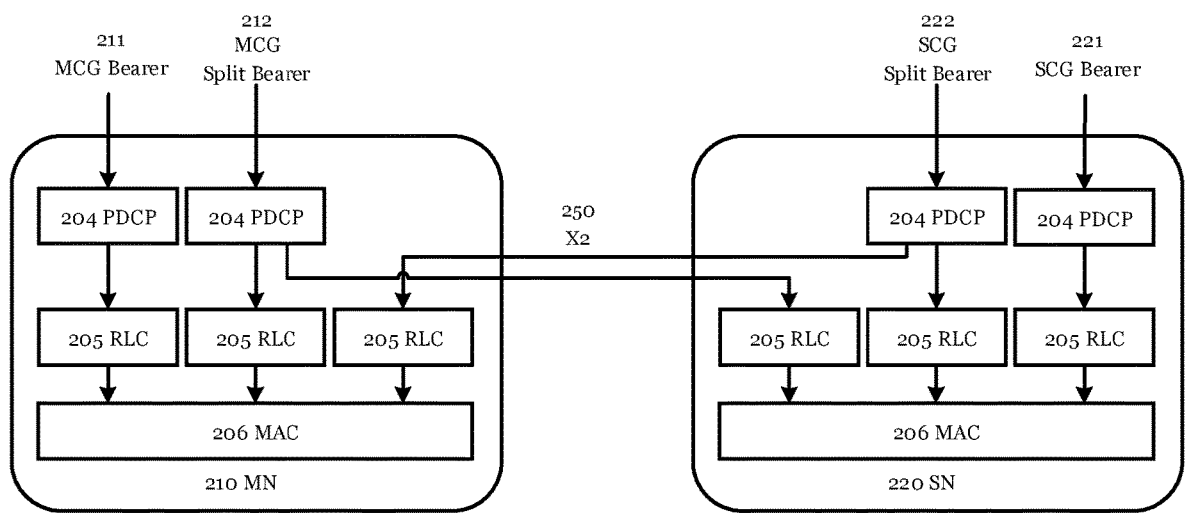
FIG. 2 illustrates a LTE-NR tight interworking (UP)
Figure 3:
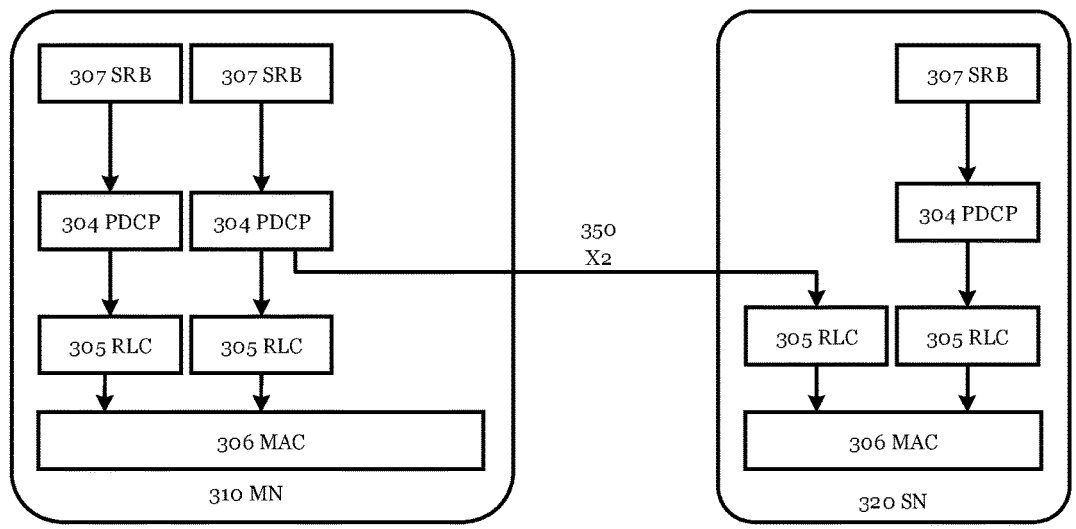
FIG. 3 shows a split bearer illustration for control plane in 5G.
Figure 4:
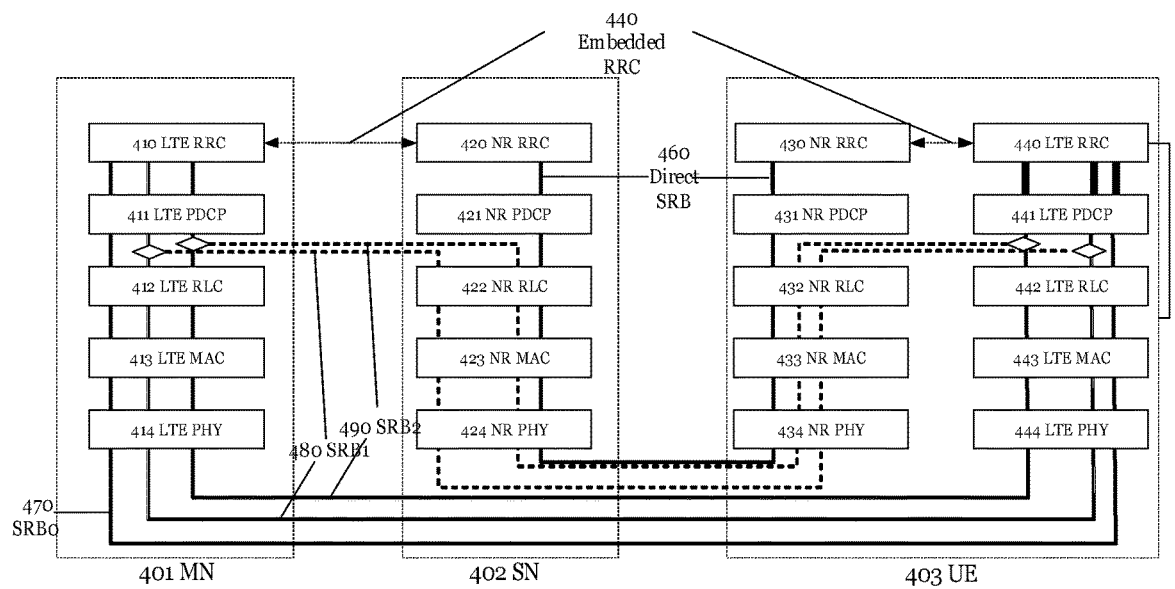
FIG. 4 illustrates LTE-NR tight interworking (CP)
Figure 5:
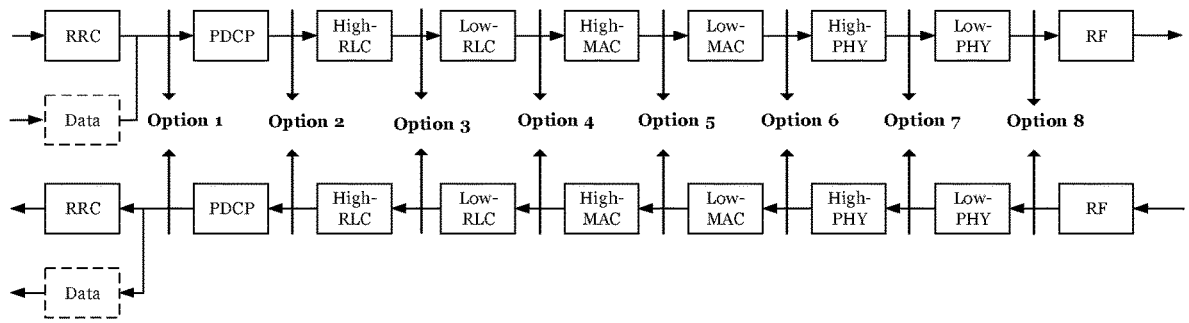
FIG. 5 shows functional split between central and distributed unit from TR 38.801.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

It should be noted that through this disclosure the interface between the MN and SN are referred to as X2, based on the current interface definitions in LTE. For LTE-NR interworking and NR-NR interworking cases, the exact name for such an interface could end up being different, e.g. Xn instead of X2, with the corresponding XnAP protocol instead of X2AP. However, that will not impact the applicability of the invention at all.

It should also be noted that though the present disclosure is focused on the centralized PDCP split architecture case that is being standardized in rel-15 option 2 as discussed above, the invention is also applicable to other split options, e.g. option 5/6, but in this case the concern will be on the loss/delay of a lower layer packet, e.g. a MAC PDU in case of option 5/6, rather than a PDCP PDU.

In the present disclosure, a receiver, for example a UE, implements a solution for detecting delayed or lost control signaling messages. The signaling messages are receivable both over a Master Node (MN), and over a Secondary Node (SN) and are transmitted by a transmitter. The transmitter assigns sequence numbers to the signaling messages and transmits the signaling messages to the receiver.

Detecting delayed or lost signaling messages is based on sequence number. The receiver detects delayed or lost signaling messages by detecting a gap in sequence numbers of received signaling messages. The messages may be Radio Resource Control (RRC) messages. The detection of delayed or lost message or messages may be based on sequence number. In one embodiment, the receiver, e.g. a UE, detects a delay or loss of a message over a Signaling Radio Bearer (SRB) by detecting a gap in the Packet Data Convergence Protocol (PDCP) sequence numbers of received messages. I.e. the UE may for example have received messages numbered . . . , 3, 4, 5. Then it receives message 7. By this sequence, the UE realizes that message 6 may be delayed or lost. Since the transmitting entity, i.e. the transmitter, in the infrastructure is assigning sequence numbers in sequence to the PDCP packets on the SRB, the gap in the received sequence number space indicates that a message may have been lost, or that it is at least delayed. In alternative embodiment, the communicating peers, i.e. the receiver and the transmitter, e.g. an MN node in the infrastructure and the UE, implement sequence numbers on the RRC messages. In one embodiment, the RRC sequence numbers are transaction identifiers, wherein each RRC message that requires a response message is associated with an identity, wherein the identity is incremented for each transaction. This means that a receiver of a message will append the corresponding transaction identifier to the corresponding response message. The transmitter then expects that each response message will contain a transaction identifier that will enable the determination of the original configuration message that the response is e.g. acknowledging or rejecting. In such an embodiment, in the receiver, for example in the UE or the MN, the aforementioned detecting is based on a gap in the sequences of transaction identifiers.

The receiver, such as the UE or the MN, may also include a timer, wherein the timer is started when a gap in sequence numbers of received messages is detected. The timer is introduced to cover for a possible delay of an RRC message causing the gap, but wherein the missing message is potentially still in transfer. In such an embodiment, the aforementioned recovery steps, as will be described in detail below, may be postponed until the expiry of the timer. While the timer is running, the processing of subsequent signaling messages that may have been received over the SRB is postponed, to ensure that the signaling messages are processed in the same order as they were transmitted from the transmitter. Once the timer expires, and if the missing message, illustrated by sequence number "6" above, remains missing, various steps for recovery may be issued. Thus, with the timer, the "detecting" comprises both starting a timer, and initiating the recovery once the timer expires.

In an alternative embodiment, the timer mentioned in the previous embodiment could be started when the sender, i.e. the transmitter, sends an RRC message to the receiver. In this case, the timer can be reset when the sender, i.e. the transmitter, receives a response message from the receiver. If the timer times out before that, this could be an indication that an RRC message has been lost.

In response to detecting a gap in the sequence numbers of the received messages, the receiver, e.g. the UE, responds by a recovery mechanism or a recovery procedure. The recovery mechanism, or the recovery procedure, includes one or multiple steps to ensure that the effects of the message delay or message loss can be minimized. In various embodiments, different recovery mechanisms can be implemented, wherein each of the recovery mechanisms can be implemented alone, or in combination. The various recovery mechanisms are disclosed in the present description.

In a first embodiment, the UE may implement a recovery by initiating an RRC Re-establishment. The re-establishment procedure is a solution known from e.g. LTE, wherein a number of steps are undertaken to recover the connection. For example, the re-establishment solution includes that the UE performs a cell selection procedure, followed by an attempt to recover the RRC connection with an RRC message. In addition, certain configurable parameters and state parameters of lower-layer protocols, such as PDCP, RLC, MAC and Phy are re-set. For details, the inventors refer to TS 36.331.

However, the inventors also realize that the known re-establishment solution is intended for recovery from problems on the radio-interface. In the described problem scenario above, it is described that messages may also be lost within the infrastructure, e.g. interfaces such as X2, F1, etc. Thus, the detection of a gap in RRC messages do not necessarily correlate with any transmission problems over the radio from or to the MN or SN, i.e. the radio may still work well. Thus, the inventors realize that the known re-establishment solution may be a too drastic recovery solution, causing unnecessary interruptions in the data transfer to and from the UE. For example, there may be no reason to perform a cell search with cell selection, and it may also be useful to maintain several aspects of the ongoing communication with the MN and SN, such as lower layer configurations.

In another embodiment, the recovery step includes the notification of a missing message on the SRB to the transmitting peer entity, i.e. the transmitter. For example, when the UE acting as a receiving entity, i.e. a receiver, has detected a need for a "recovery", it may send a message, i.e. a notification, to the transmitting entity that one or several signaling messages are identified as missing. The message can indicate missing messages by identifying missing PDCP sequence numbers. Alternatively, the message may identify missing RRC transaction identifiers.

A transmitting entity, i.e. a transmitter such as an MN node, may also include a message type identifier in each transmitted RRC message, wherein the RRC message type identifier identifies whether the concerned message must be processed in-sequence with previously transmitted messages. The receiver, such as a UE, that receives the RRC message including the message type identifier, will then include the mechanism to determine whether there is a need to initiate a recovery procedure, or if the current RRC command can be executed without waiting for the former message. Applying it to the example before, it would mean that the receiver could process message "7" before "6" is completely received, if the RRC message type identifier indicates that message "7" can be processed without waiting for "6". If not, the receiver must initiate a procedure for recovering message "6". If "6" cannot be received, the receiver may initiate further steps to recover the connection, such as e.g. an RRC re-establishment.

In yet another embodiment, the receiver, e.g. a UE, when recovering from a missing message, may initiate recovery by sending an RRC re-establishment message to the receiver, e.g. a MN. But it may be beneficial to avoid any cell search, if the UE can reliably detect that the problems are not due to issues on the radio interface, but due to other losses, e.g. within the infrastructure. For example, if the UE detects that the link quality is good on the link to both the MN and SN, and all such links where the UE has been scheduled, e.g. as indicated by a quality threshold on the link, then the UE may implement a light-weight recovery of the RRC connection, without re-setting all parameters of RLC/MAC/PHy.

In a preferred embodiment, the UE applies split SRB, in which the UE may receive and transmit messages both over an MN and an SN.

In particular, the UE may implement the radio protocol of NR, as currently being specified in 3GPP, in addition to the implementation of LTE as defined by 3GPP, and which undergoes a continuous evolution to meet the demands of future communication.

The invention also includes a receiver in the infrastructure, that is capable of detecting delayed or lost signaling messages. In a particular embodiment, the infrastructure includes an MN node implemented to detect such delayed or lost messages, for example RRC messages. In response to the detecting, the MN node may issue recovery mechanisms to minimize the effects of the lost or delayed message, as will be described in the detailed description of the present invention.

For example, the transmitting entity, i.e. the transmitter, may include the solutions for storing transmitted signaling messages until they are successfully acknowledged from the receiving peer, i.e. the receiver. The stored transmitted signaling messages will be deleted after an acknowledge response has been received from the receiver. The purpose of this storing is to enable the re-transmission of messages that may remain missing from the receiver. For example, the transmitter may store each RRC message with an associated transaction identifier, and delete the message only after a corresponding response has been received from the receiver. Alternatively, said storing could be based on lower-layer sequence numbers, such as PDCP or RLC sequence numbers, and the concerned messages are stored in a buffer at least until the message has been confirmed as received at the receiving peer. In a preferred embodiment, this storing is based on PDCP sequence numbers.

In another embodiment, the transmitting entity, upon receiving a message, i.e. a notification, from the receiver that includes an indication that some messages may be missing, can retransmit these messages but reuse the same PDCP Sequence Numbers that was used when the message, or messages, were sent the first time. The messages can be sent over the same path as the last time, or the sender can use an alternative path. For example, if the transmitter was employing split RRC and the NR leg was used for sending the message that was indicated as missing, it can send the new duplicated message via the LTE leg of the split SRB.

In another embodiment, the transmitting entity, i.e. the transmitter, starts a timer when sending, i.e. transmitting, an RRC message to a receiver. If a response message is received from the receiver, the timer is reset. If an RRC complete message corresponding to this message, i.e. a response message, is not received before this timer expires, the transmitter resends the message using the same PDCP Sequence Numbers as before. This is especially beneficial in cases where the last RRC message is lost, i.e. loss cannot be detected due to out of order delivery at the receiver.

In another embodiment, a flow control or recovery mechanism is implemented between the PDCP and RLC entities of the two network nodes involved in the communication, i.e. the master and secondary nodes for the case of split RRC or the centralized and distributed units in the case of split architecture. This could be configured to operate in a periodic manner, e.g. every x millisecond, or based on some trigger, e.g. when a PDU is received out of order. The report sent to the transmitter could include an indication of the missing PDU(s), e.g. using a bitmap. When the transmitter gets such a status report indicating missing PDUs, it will retransmit them. In the case of split RRC, the retransmission can be either via the same leg or using the alternate leg. In case the decision was to transmit via the alternate leg, information can be sent to the corresponding node indicating this so that the corresponding node will not stall waiting for that packet.

In another embodiment, the MN, upon detecting that the UE has a good radio link towards both the SN and MN, and that the problem is probably in the X2 interface, e.g. from UE measurement reports and indications from the UE of the loss or severe delay of RRC messages, as covered in some of the UE embodiments above, may trigger an SN change procedure towards a target SN where the X2 link between the MN and the target SN is less congested and the UE also has good radio link to the target SN, e.g. as could be seen from measurement reports.

In another embodiment, the sender node, i.e. the transmitter, includes a poll indication transmitted together with the RRC message, for example as part of RRC, or as part of lower layer, e.g. PDCP. When the receiver receives this message with a poll indication it should send an acknowledgement message, e.g. RRC or PDCP, to the sender to indicate the receiver has received the message.

Figure 6:
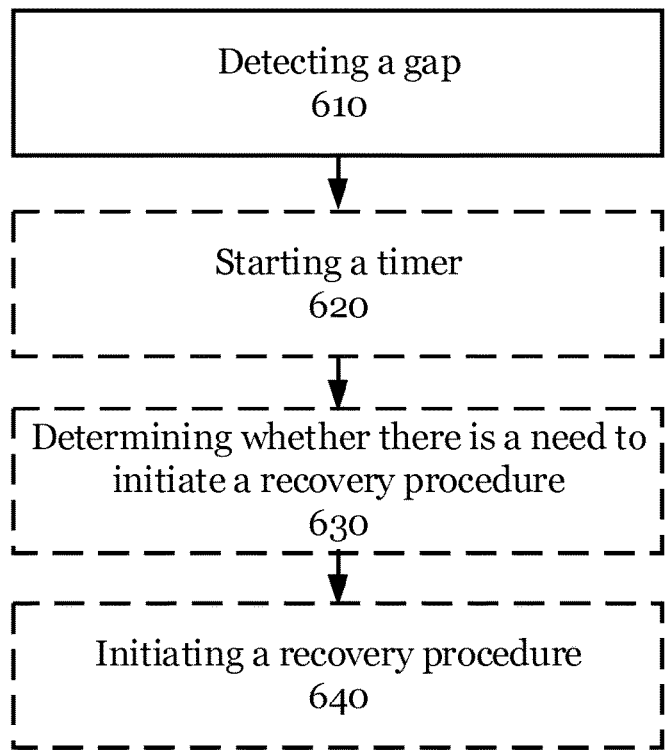
FIG. 6 illustrates a flowchart for a receiver according to an example embodiment.

FIG. 6 illustrates a flowchart for the receiver according to an example embodiment. The receiver detecting (610) a gap in sequence numbers of received signaling messages.

The method may further comprise starting (620) a timer when a gap in sequence numbers of received messages is detected, in order to cover for a possible delay of the RRC message causing the gap, but wherein the missing message potentially is still in transfer and wherein the recovery procedure is postponed until the expiry of the timer.

The method may further comprise determining (630) whether there is a need to initiate a recovery procedure or if a current RRC command can be executed without waiting for a former message.

The method may further comprise initiating (640) a recovery procedure, in response to detecting a gap in the sequence numbers of the received messages, to ensure that the effects of a message delay or a message loss may be minimized.

Figure 7:
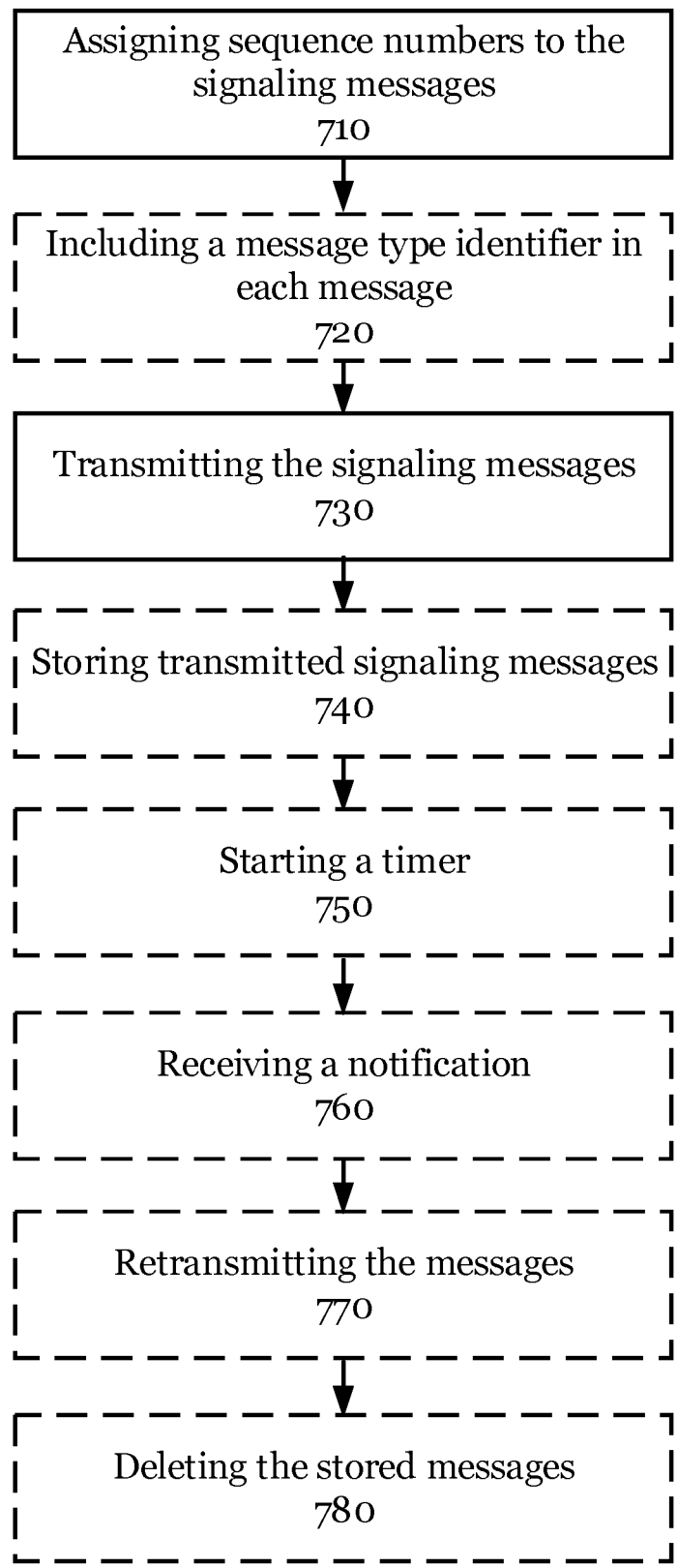
FIG. 7 illustrates a flowchart for a transmitter according to an example embodiment.

FIG. 7 illustrates a flowchart for a transmitter according to an example embodiment. The transmitter assigning (710) sequence numbers to the signaling messages and transmitting (730) the signaling messages to a receiver.

The method may further comprise including (720) a message type identifier in each transmitted RRC message, wherein the RRC message type identifier identifies whether the concerned message must be processed in-sequence with previously transmitted messages.

The method may further comprise storing (740) transmitted signaling messages until they are successfully acknowledged from the receiver in order to enable a re-transmission of missing messages.

The method may further comprise receiving (760) a notification of a missing signaling message from the receiver, and retransmitting (770) the signaling messages reusing the same sequence numbers that was used when the message(s) was sent the first time.

The method may further comprise deleting (780) the stored signaling message after an acknowledge response has been received from the receiver.

In the present application, we use the terms UE (User Equipment), terminal, handset etc. interchangeably to denote the device that communicates with the infrastructure. The term should not be construed as to mean any specific type of device, it applies to them all, and the solutions described here are applicable to all devices that use the concerned solution to solve the problems as described. Similarly, a base station is intended to denote the node in the infrastructure that communicates with the UE. Different names may be applicable, and the functionality of the base station may also be distributed in various ways. For example, there could be a radio head terminating parts of the radio protocols and a centralized unit that terminates other parts of the radio protocols. We will not distinguish such implementations here, instead the term base station will refer to all alternative architectures that can implement the concerned invention.

The present invention uses the terms MN and SN. In other situations, the terms MeNB and SeNB, respectively, are also used.

Figure 8:
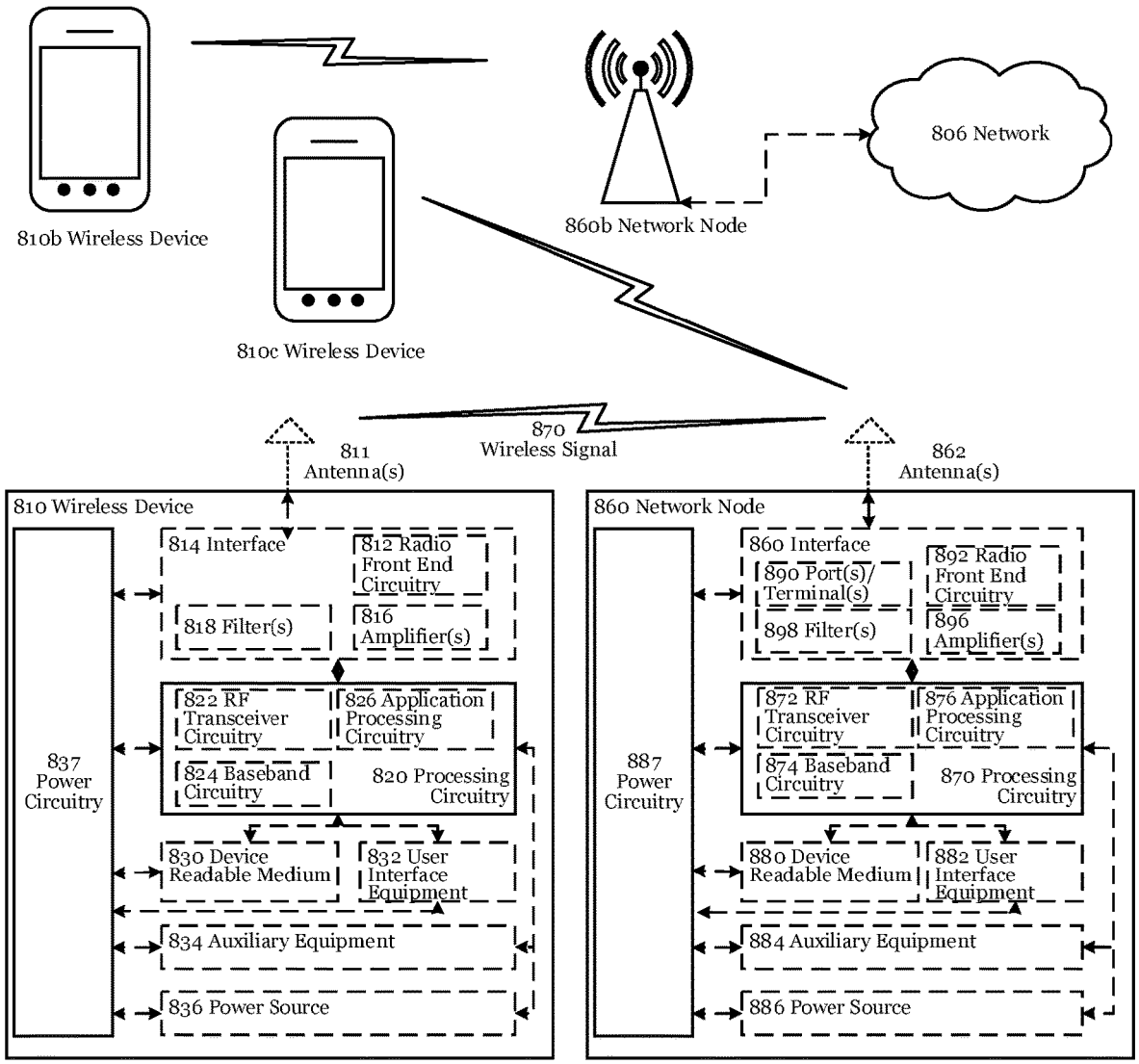
FIG. 8 illustrates a wireless communication network according to one embodiment.

Although the subject matter described herein may be implemented in any appropriate type of system using any suitable components, the embodiments described herein relate to a wireless network, such as the example wireless communication network illustrated in FIG. 8. For simplicity, the wireless communication network of FIG. 8 only depicts network 806, network nodes 860 and 860b, and Wireless Devices (WDs) 810, 810b, and 810c. The wireless communication network may further include any additional elements suitable to support communication between wireless devices or between a wireless device and another communication device, such as a landline telephone. Of the illustrated components, network node 860 and wireless device (WD) 810 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, network node 860 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 8, Network node 860 includes processing circuitry 870, device readable medium 880, interface 890, user interface equipment 882, auxiliary equipment 884, power source 886, power circuitry 887, and antenna 862. Although network node 860 illustrated in the example wireless communication network of FIG. 8 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features or benefits discussed herein.

In some embodiments, processing circuitry 870 may include a system on a chip (SOC) and may include one or more of radio frequency (RF) transceiver circuitry 872, and baseband processing circuitry 874 in addition to application processing circuitry 876. In some embodiments, radio frequency (RF) transceiver circuitry 872, baseband processing circuitry 874, and application processing circuitry 876 may be on separate chips (or sets of chips). In alternative embodiments, part or all of baseband processing circuitry 874 and application processing circuitry 876 may be combined into one chip or set of chips, and RF transceiver circuitry 872 may be on a separate chip or set of chips. In still alternative embodiments, part or all of RF transceiver circuitry 872 and baseband processing circuitry 874 may be on the same chip or set of chips, and application processing circuitry 876 may be on a separate chip or set of chips. In yet other alternative embodiments, part or all of RF transceiver circuitry 872, baseband processing circuitry 874, and application processing circuitry 876 may be combined in the same chip or set of chips.

In certain embodiments, some or all of the functionality described herein as being provided by a network node, base station, eNB or other such network device may be provided by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Processing circuitry 870 may be configured to perform any determining operations described herein as being performed by a network node. Determining as performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 may be used in the wired or wireless communication of signaling and/or data between network node 860, network 806, and/or WDs 810. Interface 890 may be transceiver circuitry that comprises one or more ports or terminals 894 that may perform any formatting, coding, or translating that may be needed to allow network node 860 to send and receive data, for example to and from network 806 over a wired connection. Interface 890 may also include radio front end circuitry 892 that may be coupled to or a part of antenna 862. Radio front end circuitry 892 may be coupled to various filters 898 and amplifiers 896. Radio front end circuitry 892 may be connected to antenna 862 and processing circuitry 870. Radio front end circuitry may be configured to condition signals communicated between antenna 862 and processing circuitry 870. In certain alternative embodiments, network node 860 may not include separate radio front end circuitry 892, instead, processing circuitry 870 may comprise radio front end circuitry and may be connected to antenna 862 without separate radio front end circuitry 892. Radio front end circuitry 892 may receive digital data that is to be sent out to other network nodes or WDs via a wireless connection. The radio may convert the digital data into a radio signal having the appropriate channel and bandwidth parameters using a combination of filters 898 and/or amplifiers 896. The radio signal may then be transmitted via antenna 862 to the appropriate recipient (e.g., WD 810). These, or similar, components may also work for wireless signals that are received by antenna 862 and converted into digital data for use by processing circuitry 870.

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within an area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and may be configured to supply the components network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack, which is connected to, or integrated in, power circuitry 887. The battery may provide backup power should the external power source fail. Other types of power sources, such as photovoltaic devices, may also be used.

User interface equipment 882 may include input interfaces, devices and circuits, and output interfaces, devices and circuits. User interface equipment 882 is configured to allow input of information into network node 860, and is connected to processing circuitry 870 to allow processing circuitry 870 to process the input information. User interface equipment 882 may include, for example, a microphone, a proximity or other sensor, keys/buttons, a touch display, one or more cameras, a USB port, or other input elements. User interface equipment 882 is also configured to allow output of information from network node 860, and to allow processing circuitry 870 to output information from network node 860. User interface equipment 882 may include, for example, a speaker, a display, vibration generating circuitry, a USB port, a headphone interface, or other output elements. Using one or more input and output interfaces of user interface equipment 882, network node 860 may communicate with end users and/or the wireless network, and allow them to benefit from the functionality described herein. For example, user interface equipment 882 may be used when installing, configuring, troubleshooting, repairing, or otherwise working on network node 860.

Alternative embodiments of network node 860 may include additional components beyond those shown in FIG. 8 that may be responsible for providing certain aspects of the network node's functionality, including any of the functionality described herein and/or any functionality necessary to support the subject matter described herein.

As used herein, wireless device (WD) refers to a device capable, configured, arranged and/or operable to communicate wirelessly with network nodes and/or other wireless devices. Communicating wirelessly may involve transmitting and/or receiving wireless signals using electromagnetic signals, radio waves, infrared signals, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, user equipment (UE), smart phone, mobile phone, cell phone, voice over IP (VoIP) phone, wireless local loop phone, desktop computer, personal data assistant (PDA), wireless cameras, gaming terminal devices, music storage, playback appliances, wearable terminal devices, wireless endpoints, mobile stations, tablets, laptops, laptop-embedded equipment (LEE), laptop-mounted equipment (LME), USB dongles, smart devices, wireless customer-premise equipment (CPE) and vehicle-mounted wireless terminal devices. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

Wireless device 810 may include antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies integrated into WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

Interface 814 may be transceiver circuitry comprising various radio front end circuitry 812, filters 818 and amplifiers 816. Interface 814 is connected to antenna 811 and processing circuitry 820, and is configured to condition signals communicated between antenna 811 and processing circuitry 820. Radio front end circuitry 812 may be coupled to or a part of antenna 811. Radio front end circuitry 812 may be coupled to various filters 818 and amplifiers 816. Radio front end circuitry may be configured to condition signals communicated between antenna 811 and processing circuitry 820. In some embodiments, WD 810 may not include separate radio front end circuitry 812, rather processing circuitry 820 may comprise radio front end circuitry and may be connected to antenna 811. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811 to the appropriate recipient. These, or similar, components may also work for wireless signals that are received by antenna 811 and converted into digital data for use by processing circuitry 820.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

Processing circuitry 820 of WD 810 may comprise a SOC and may include one or more of RF transceiver circuitry 822, and baseband processing circuitry 824, in addition to application processing circuitry 826. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being provided by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining operations described herein as being performed by a WD. Determining as performed by processing circuitry 820 may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store instructions, such as a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a remotely hosted website or application. User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input elements. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output elements. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet) or photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
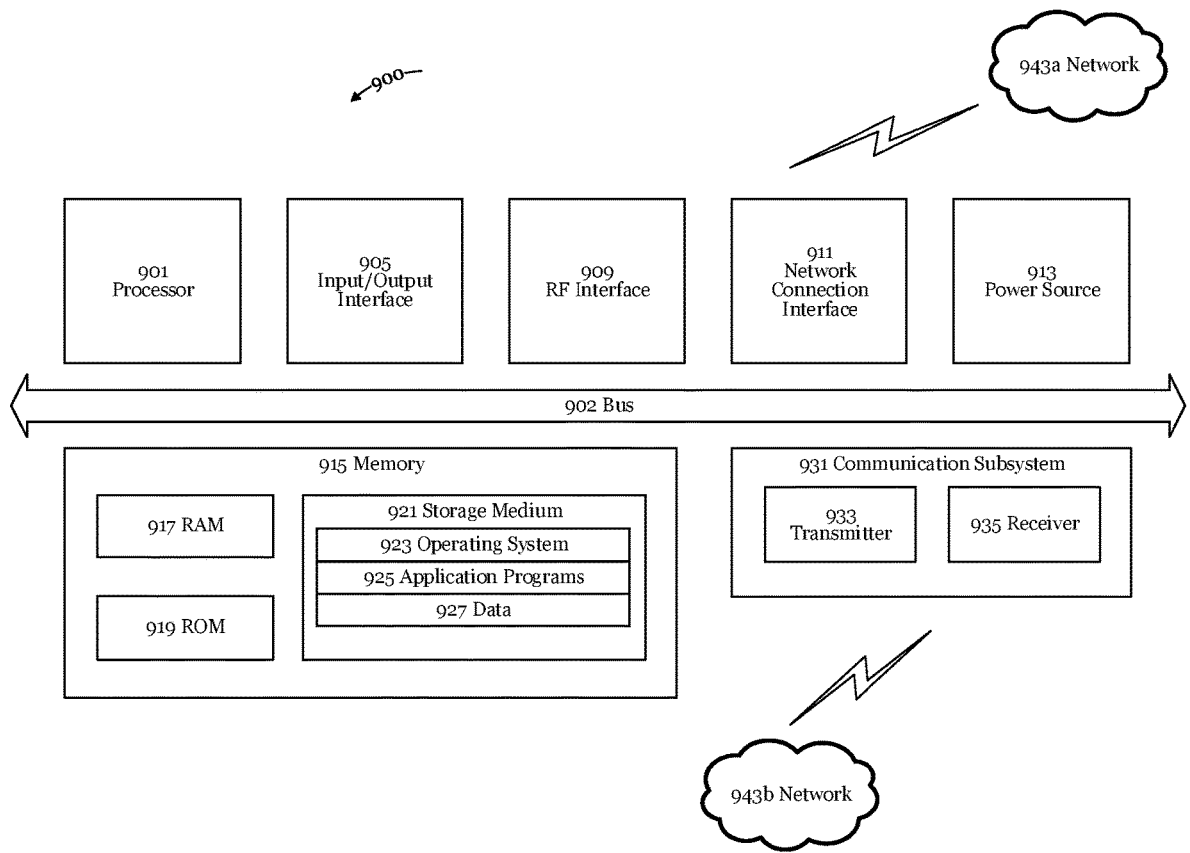
FIG. 9 shows a user equipment according to one embodiment.

9 FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. UE 900, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 may include operating system 923, application program 925, data 927, or the like. Specific devices may utilize all of the components shown in FIG. 9, or only a subset of the components. The level of integration between the components may vary from device to device. Further, specific devices may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a mouse, a trackball, a directional pad, a trackpad, a presence-sensitive input device, a display such as a presence-sensitive display, a scroll wheel, a camera (e.g., a digital camera, a digital video camera, a web camera, etc.), a microphone, a sensor, a smartcard, and the like. The presence-sensitive input device may include a digital camera, a capacitive or resistive touch sensor, a digital video camera, a web camera, a microphone, a sensor, or the like to sense input from a user. The presence-sensitive input device may be combined with the display to form a presence-sensitive display. Further, the presence-sensitive input device may be coupled to processing circuitry 901. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and wireless communication networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other nodes over a communication network according to one or more communication protocols known in the art or that may be developed, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols known in the art or that may be developed, such as IEEE 802.xx, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and wireless communication networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 performs the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
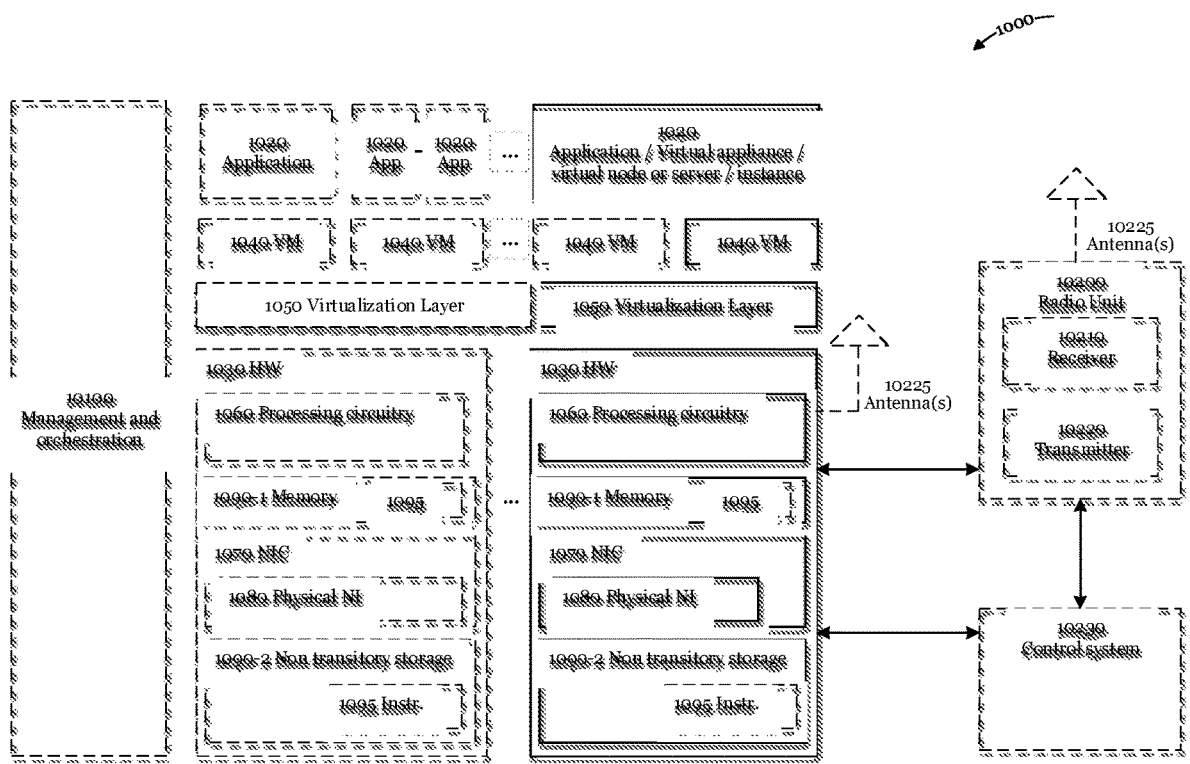
FIG. 10 illustrates a virtualization environment according to one embodiment.

FIG. 10 is a schematic block diagram illustrating a virtualization environment 1000 in which functions implemented by some embodiments may be virtualized. In the present context, virtualizing means creating virtual versions of apparatus or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 run in virtualization environment 1000 which provides hardware 1030 comprising processing circuitry 1060 and memory 1090. Memory 1090 contains instructions 1095 executable by processing circuitry 1060 whereby application 1020 is operative to provide any of the relevant features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware devices may also include non-transitory, persistent, machine-readable storage media 1090-2 having stored therein software 1095 and/or instruction executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node, with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a virtual machine 1040 is a software implementation of a physical machine that runs programs as if they were executing on a physical, non-virtualized machine. Each of virtual machines 1040, and that part of the hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 10230 which may alternatively be used for communication between the hardware nodes 1030 and radio units 10200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 11:
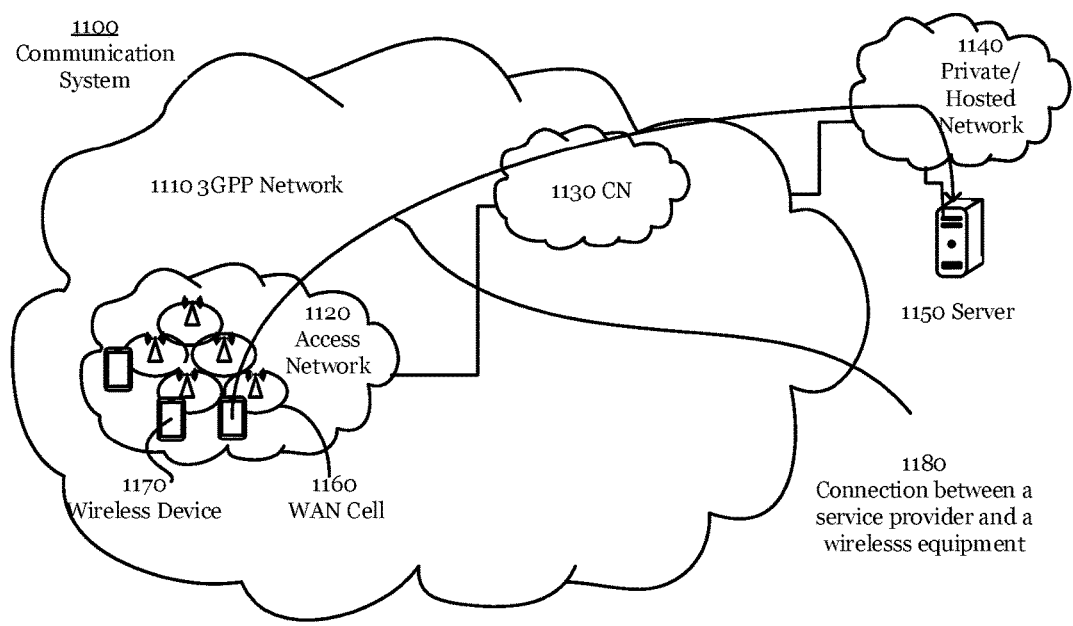
FIG. 11 shows an example wireless communication network.

Although the solutions described above may be implemented in any appropriate type of system using any suitable components, particular embodiments of the described solutions may be implemented in a network configuration such as the example communication network illustrated in FIG. 11.

In the example embodiment disclosed in FIG. 11, a connection is established between a host computer 1150, such as a server or a media server, and a wireless device 1170, as is shown by the connection arrow 1180, through and by a private/hosted network 1140, a Core Network (CN) 1130 and a cellular wireless access network 1120 comprising several Wide Area Access (WAN) cells 1160. The CN 1130 and the access network 1120 are indicated to be 3GPP compliant networks, however it should be noted that it is possible to establish connectivity between the host computer 1150 and the wireless device 1170 using non-3GPP wireless networks such as for instance a WiFi network. In some embodiments, the host computer 1150 is configured to provide the wireless device 1170 with data over the established connection, in other embodiments the wireless device 1170 provides the host computer 1150 with data and in yet other embodiments the wireless device 1170 and the host computer 1150 provide each other with data.

The data may be both user plane data and control plane data. Control plane data can be used by the wireless device and host computer for configuration, and user plane data are providing information from and to respective part. Example of user plane data can for instance be voice, video or other type of data primarily used for consumption on either end.

The communication system illustrated in FIG. 11 is suitable for providing data transport between a service provider and a wireless device 1170, such as a User Equipment (UE), an Internet of Things (IoT) device and several other types of devices utilizing the wireless connectivity provided in part by the wireless network and in part of the CN 1130, private/hosted network 1140 and host computer 1150.

The communication system 1100 provides a number of required and optional features for delivering secure, fast and flexible data transport such as Mobility, Authentication, Charging, Low Latency, High Availability and many other.

Figure 12:
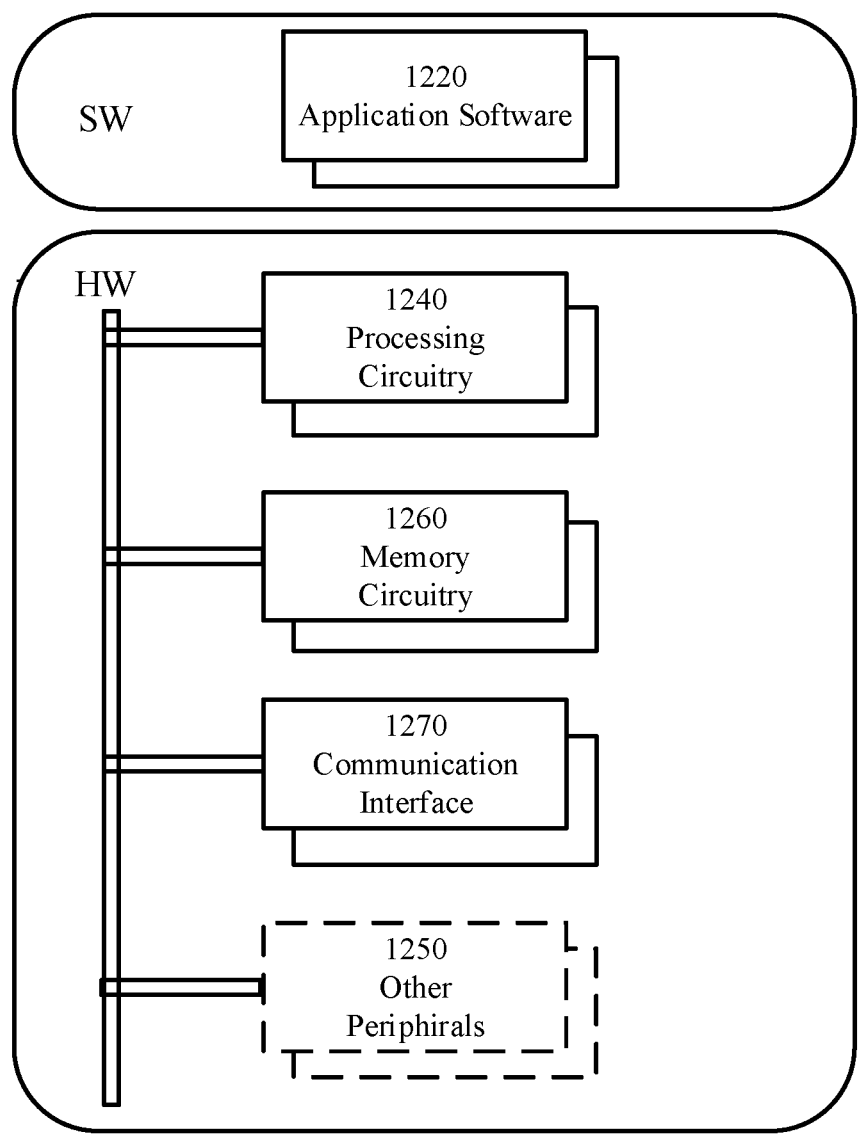
FIG. 12 illustrates a host computer according to one embodiment.

Although the solutions described above may be implemented in any appropriate type of system using any suitable components, particular embodiments of the described solutions may be at least partly implemented in a host computer illustrated in FIG. 12.

The host computer is provided with a communications interface 1270 for sending and receiving data to and from the wireless device. The communications interface 1270 comprises in one embodiment at least one, but in some embodiment multiple receiver circuitry, transmitting circuitry and processing circuitry 1240 for controlling the communication interface 1270. Thus, the term communications interface 1270 should be construed to include embodiments where communications is facilitated in wireless mode, in wired mode or in both wireless and wired mode. A communication interface 1270 may consequently comprise features supporting multiple simultaneous communication channels. The host computer is further provided with processing circuitry 1240 coupled to memory circuitry 1260 and the said transmitter and receiver circuitry for controlling the host computer and executing software applications 1220 running on the host computer, such as software application 1220 implementing at least parts of the solutions disclosed herein.

The host computer may also be fitted with other circuitry for performing various services, functions and processing as needed to fulfill and comply with the features required for providing the requested services. The application software 1220 is running on the processing circuitry 1240, controlling the memory 1260 and communications interface 1270 and will generate and send data to the wireless device as well as receive, analyze, store and consume data from the wireless device. In one embodiment, the software application 1220 may be hosted in a cloud environment and will then share hardware with other software applications possibly from other enterprises.

ABBREVIATIONS
At least some of the following abbreviations may be used in this disclosure.

| | |
|---|---|
| 1x RTT | CDMA2000 1x Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |

ABBREVIATIONS
At least some of the following abbreviations may be used in this disclosure.

| | |
|---|---|
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR (corresponding to eNB in LTE) |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |

ABBREVIATIONS
At least some of the following abbreviations may be used in this disclosure.

| | |
|---|---|
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |
| AP | Application Protocol |
| CP | Control Plane |
| DC | Dual Connectivity |
| DL | Downlink |
| DRB | Data Radio Bearer |
| E-RAB | EUTRAN Radio Access Bearer |
| GTP-U | GPRS Tunneling Protocol - User Plane |
| IP | Internet Protocol |
| LTE | Long Term Evolution |
| MCG | Master Cell Group |
| MAC | Medium Access Control |
| MeNB | Master eNB |
| MN | Master Node |
| NR | New Radio |
| PDCP | Packet Data Convergence Protocol |
| RLC | Radio Link Control |
| RRC | Radio Resource Control |
| SCG | Secondary Cell Group |
| SCTP | Stream Control Transmission Protocol |
| SeNB | Secondary eNB |
| SN | Secondary Node |
| SRB | Signaling Radio Bearer |
| TEID | Tunnel Endpoint IDentifier |
| TNL | Transport Network Layer |
| UDP | User Datagram Protocol |
| UE | User Equipment |
| UL | Uplink |
| UP | User Plane |

The invention claimed is:

1. A method implemented in a receiver for detecting delayed or lost control signaling messages, wherein the signaling messages are Radio Resource Control (RRC) messages, and wherein the signaling messages are receivable both over a Master Node (MN) and a Secondary Node (SN) and wherein detecting delayed or lost signaling messages is based on sequence numbers, wherein the RRC message further includes a message type identifier, which identifies whether said message must be processed in-sequence with previously transmitted messages, the method comprising:
   detecting a gap in sequence numbers of received signaling messages, and
   determining whether there is a need to initiate a recovery procedure or if a current RRC command can be executed without waiting for a former message.

2. The method according to claim 1, wherein the gap in sequence numbers of received RRC messages may be detected by a gap in sequence numbers of transaction identifiers, wherein the transaction identifiers are sequence numbers implemented on the RRC messages.

3. The method according to claim 1, wherein the gap in sequence numbers of received messages may be detected by a gap in Packet Data Convergence Protocol (PDCP) sequence numbers of the received messages.

4. The method according to claim 1, wherein the method further comprises:
   initiating a recovery procedure, in response to detecting a gap in the sequence numbers of the received messages, to ensure that the effects of a message delay or a message loss may be minimized.

5. The method according to claim 4, wherein the method further comprises:
   starting a timer, when a gap in sequence numbers of received messages is detected, in order to cover for a possible delay of the RRC message causing the gap, but wherein the missing message potentially is still in transfer and wherein the recovery procedure is postponed until the expiry of the timer.

6. The method according to claim 4, wherein the recovery procedure includes sending a notification of a missing message to the transmitter.

7. The method according to claim 4, wherein the recovery procedure comprises:
   initiating an RRC re-establishment, which comprises:
   performing a cell selection procedure, and
   attempting to recover the RRC connection with an RRC message.

8. The method according to claim 7, wherein the recovery procedure further comprises:
   resetting configurable parameters and state parameters of lower-layer protocols, including at least one of: PCDP, Radio Link Control (RLC), Medium Access Control (MAC), and Phy.

9. A receiver for detecting delayed or lost control signaling messages wherein the signaling messages are Radio Resource Control (RRC) messages, and, wherein the signaling messages are receivable both over a Master Node (MN) and a Secondary Node (SN) and wherein detecting delayed or lost signaling messages is based on sequence number, wherein the RRC message further includes a message type identifier, which identifies whether said message must be processed in-sequence with previously transmitted messages, said receiver comprising RF transceiver circuitry, device readable medium and processing circuitry, wherein the processing circuitry is configured to control the device readable medium and transceiver circuitry to:

detect a gap in sequence numbers of received messages, and determining whether there is a need to initiate a recovery procedure or if a current RRC command can be executed without waiting for a former message.

10. The receiver according to claim 9, wherein the processing circuitry is further configured to control the device readable medium and the transceiver circuitry to detect the gap in sequence numbers of received messages by a gap in sequence numbers of transaction identifiers, wherein the transaction identifiers are sequence numbers implemented on the RRC messages.

11. The receiver according to claim 9, wherein the processing circuitry is further configured to control the device readable medium and the transceiver circuitry to detect the gap in sequence numbers of received messages by a gap in Packet Data Convergence Protocol (PDCP) sequence numbers of received.

12. The receiver according to claim 9, wherein the processing circuitry is further configured to control the device readable medium and the transceiver circuitry to:

initiate a recovery procedure, in response to that a gap in the sequence numbers of the received messages is detected, to ensure that the effects of a message delay or a message loss may be minimized.

13. The receiver according to claim 12, wherein the processing circuitry is further configured to control the device readable medium and the transceiver circuitry to:

start a timer when a gap in sequence numbers of received messages is detected, in order to cover for a possible delay of the RRC message causing the gap, but wherein the missing signaling message potentially is still in transfer, and wherein the recovery procedure is postponed until the expiry of the timer.

14. The receiver according to claim 12, wherein the processing circuitry is further configured to control the device readable medium and the transceiver circuitry to initiate the recovery procedure by sending a notification of a missing message to the transmitter.

15. The receiver according to claim 12, wherein the processing circuitry is further configured to control the device readable medium and the transceiver circuitry to perform the recovery procedure by:

initiating an RRC re-establishment, wherein the processing circuitry is further configured to control the device readable medium and the transceiver circuitry to:

perform a cell selection procedure, and attempt to recover the RRC connection with an RRC message.

16. The receiver according to claim 15, wherein the processing circuitry is further configured to control the device readable medium and the transceiver circuitry to re-set configurable parameters and state parameters of lower-layer protocols, including at least one of: PCDP, Radio Link Control (RLC), Medium Access Control (MAC), and Phy.

17. The receiver according to claim 9, wherein the receiver is a User Equipment (UE), or a receiver in the infrastructure.

18. A method implemented in a transmitter for transmitting control signaling messages, wherein the signaling messages are Radio Resource Control (RRC) messages, wherein the signaling messages are transmittable both over a Master Node (MN) and a Secondary Node (SN), the method comprising:

assigning sequence numbers to the signaling messages;

including a message type identifier in each transmitted RRC message, wherein the RRC message type identifier identifies whether the concerned message must be processed in-sequence with previously transmitted messages; and transmitting the signaling messages to a receiver.

19. The method according to claim 18, wherein the method further comprises:

storing transmitted signaling messages until they are successfully acknowledged from the receiver, to enable a re-transmission of missing messages.

20. The method according to claim 19, wherein the method further comprises:

deleting the stored signaling message after an acknowledge response has been received from the receiver.

21. The method according to claim 18, wherein the method further comprises:

receiving a notification of a missing signaling message from the receiver, and retransmitting the signaling message reusing the same sequence numbers that was used when the message was sent the first time.

22. The method according to claim 18, wherein the method further comprises:

starting a timer when the RRC message is transmitted to the receiver, and resetting the timer when a response message is received from the receiver, or if the timer times out before, retransmitting the signaling message using the same sequence numbers that was used when the message(s) was sent the first time.

23. A transmitter for transmitting control signaling messages, wherein the signaling messages are Radio Resource Control (RRC) messages, wherein the signaling messages are transmittable both over a Master Node (MN) and a Secondary Node (SN), said transmitter comprising RF transceiver circuitry, device readable medium and processing circuitry, wherein the processing circuitry is configured to control the device readable medium and transceiver circuitry to:

assign sequence numbers to the signaling messages;

include a message type identifier in each transmitted RRC message, wherein the RRC message type identifier identifies whether the concerned message must be processed in-sequence with previously transmitted messages, and transmit the signaling messages to a receiver.

24. The transmitter according to claim 23, wherein the processing circuitry is further configured to control the device readable medium and the transceiver circuitry to:

store transmitted signaling messages until they are successfully acknowledged from the receiver in order to enable a re-transmission of missing messages.

25. The transmitter according to claim 24, wherein the processing circuitry is further configured to control the device readable medium and the transceiver circuitry to:

delete the stored signaling message after an acknowledge response has been received from the receiver.

26. The transmitter according to claim 23, wherein the processing circuitry is further configured to control the device readable medium and the transceiver circuitry to:

receive a notification of a missing signaling message from the receiver, and retransmit the signaling message reusing the same sequence number that was used when the message was sent the first time.

27. The transmitter according to claim 23, wherein the processing circuitry is further configured to control the device readable medium and the transceiver circuitry to:
- start a timer when the RRC message is transmitted to the receiver, and
- reset the timer when a response message is received from the receiver, and
- if the timer times out before, retransmit the signalling message reusing the same sequence numbers that was used when the message(s) was sent the first time.

28. The transmitter according to claim 23, wherein the transmitting entity is a User Equipment (UE) or a MN.

* * * * *